United States Patent [19]

Graff

[11] 3,950,314

[45] Apr. 13, 1976

[54] PROCESS FOR IMPROVING THERMOFORMABILITY OF METHYL METHACRYLATE POLYMERS AND THE IMPROVED COMPOSITIONS

[75] Inventor: Robert M. Graff, Cornwells Heights, Pa.

[73] Assignee: Rohm and Haas Company, Philadelphia, Pa.

[22] Filed: June 17, 1974

[21] Appl. No.: 480,184

[52] U.S. Cl. ......... 260/80.73; 260/80.8; 260/80.81; 260/86.1 R; 260/86.1 E; 260/86.1 N; 260/86.7; 260/89.5 A; 260/885

[51] Int. Cl.²................ C08F 120/14; C08F 220/14

[58] Field of Search.. 260/45.7 S, 45.75 R, 45.75 B, 260/45.75 C, 45.75 K, 45.75 T, 45.75 S, 45.75 N, 45.75 V, 45.75 W, 45.85 R, 89.5 R, 89.5 A, 89.5 S, 86.1 R, 86.1 N, 86.1 E, 885, 86.7, 80.73, 80.8, 80.81

[56] References Cited
UNITED STATES PATENTS

| | | | |
|---|---|---|---|
| 2,347,320 | 4/1944 | Hiltner | 260/86.1 E |
| 2,888,435 | 5/1959 | Wallace | 260/45.75 S |
| 3,534,121 | 10/1970 | Eggensperger | 260/45.75 S |
| 3,562,305 | 2/1971 | Hoch | 260/45.75 S |

*Primary Examiner*—Harry Wong, Jr.
*Attorney, Agent, or Firm*—Michael B. Fein

[57] ABSTRACT

Compositions comprising methyl methacrylate polymers and copolymers containing about 0.0002 to 0.004 moles, based on metal, per 1000 grams of polymer, of a compound of certain metal compounds effective to prevent bubble formation at thermoforming temperatures. Also disclosed is a process for improving the thermoformability of methyl methacrylate polymers comprising introducing said compound in the monomer system before polymerization.

9 Claims, No Drawings

PROCESS FOR IMPROVING THERMOFORMABILITY OF METHYL METHACRYLATE POLYMERS AND THE IMPROVED COMPOSITIONS

BACKGROUND OF THE INVENTION

1. Field of the Invention

This invention relates to methyl methacrylate polymers and copolymers and especially to acrylic sheet.

2. DESCRIPTION OF THE PRIOR ART

Metal esters are known as additives to polyesters, vinyl chloride and acrylonitrile polymers, generally as thermal stabilizers, flame retardant additives and infrared absorbers. See U.S. Pat. Nos. 3,705,137; 3,647,729; 3,553,160; 3,382,209; and 3,374,200. The levels of metal used in prior polymer compositions are relatively high.

Continuously cast polymethyl methacrylate sheet is well known, but to achieve rapid casting rates it has heretofore been necessary to introduce relatively high crosslinker levels, otherwise the resultant sheet cannot be thermoformed without undesirable bubble formation. However, at these crosslinker levels the sheet looses other properties such as solvent cementability.

SUMMARY OF THE INVENTION

It is an object of the present invention to improve the properties of cast polymethyl methacrylate (pMMA) sheet.

A further object is to provide pMMA sheet which can be thermoformed without bubble formation.

A still further object is to provide continuously cast pMMA sheet which is resistant to bubble formation at thermoforming temperatures.

An additional object is to provide a process for making improved pMMA sheet.

Another object is to provide a solvent-cementable, continuously cast acrylic sheet.

A further object is to provide a process for rapidly and continuously casting acrylic sheet at low crosslinker levels.

These objects, and others as will become apparent, are achieved by the present invention which comprises, in one aspect, a composition comprising (A) a polymer of a monomer system containing at least 50 weight percent methyl methacrylate monomer and (B) about 0.0002 to 0.004 moles, based on metal, per 1000 gms. of (A), of a compound of the formula $$R_zM(XR')_y \qquad (I)$$

wherein $z = 0$ to 3; $y = 1$ to 4; $+y =$ valance of M; X represents

or —S—; M, when X is —S—, is a metal selected from the group consisting of $Pb^{II}$, $Pb^{IV}$, $Sn^{II}$, $Sn^{IV}$, $Zn^{II}$, $Cd^{II}$, and $Cu^{II}$; M, when X is

is a metal selected from the group consisting of $Pb^{II}$, $Pb^{IV}$, $Sn^{II}$, $Sn^{IV}$, $Zn^{II}$, $Sb^{III}$, $Cd^{II}$, $Cu^{II}$, $Al^{III}$, and $Ni^{III}$; R R' are the same or different acyclic or cyclic alkyl, alkenyl or alkynyl radicals containing 1 to 20 carbon atoms and optionally containing one or more substituents selected from the group consisting of halo-, alkoxy-, carboxy-, and hydroxy; said compounds being further defined as effective to prevent bubble formation at thermoforming temperatures.

In another aspect, the invention comprises a process for improving the thermoformability of polymers which are polymerized from a monomer system containing at least 50 weight percent methyl methacrylate comprising introducing about 0.0002 to 0.004 moles, based on metal, per 1000 gms. of monomer system, of a compound of the formula defined in formula I in the monomer system.

In formula I, when X is

the oxygen is adjacent to M.

The polymers are of monomer systems comprising at least 50% by weight methyl methacrylate and are useful for a wide variety of well known purposes, including molded articles as well as cast sheet. Among the comonomers which can be used to copolymerize with methyl methacrylate are the lower alkyl acrylates such as methyl acrylate, ethyl acrylate, propyl acrylates, butyl acrylates, the lower alkyl methacrylates wherein the alkyl group has between two and four carbon atoms, the polymerizable styrenes, cycloalkyl esters of acrylic and methacrylic acid such as cyclohexyl acrylate and cyclohexyl methacrylate, acrylic acids and amides such as methacrylic acid, methacrylamide, and the like. These comonomers can be used in varying quantities. However, for making cast sheet, it is generally preferred that there be at least 70% methyl methacrylate present in the monomer system. It is most preferred that in continuously cast sheet that the sole monomer be methyl methacrylate, generally as a solution of poly(methyl methacrylate) in methyl methacrylate monomer. In prior continuous cast systems, small quantities of cross-linking agents were also included to achieve high molecular weights of polymer. Suitable cross-linking agents have been dimethacrylate esters of glycols, trimethacrylate esters of triols, and the like, such as trimethylol propane trimethacrylate. The disadvantage of cross-linking is that it results in a sheet which takes on the characteristics of a thermoset material. Although the present invention does not exclude the presence of cross-linking agents, it does make possible the rapid continuous polymerization of such systems to high molecular weights substantially without the need for cross-linking agents in the monomer system.

The metal compounds defined herein not only allow for the achievement of high molecular weights without crosslinking agent, or with lowered cross-linking agent levels, they also improve the properties of this class of polymers, especially the substantially non-cross-linked polymers, so that they have a reduced tendency to bubble at thermoforming temperatures. By "substantially non-cross-linked" is meant less than 0.2 wt. % cross-linking monomer based on weight of monomer system. The general thermoforming temperatures for homopolymer of methyl methacrylate are about 160 to 180°C., but for other polymers other temperatures are used. These bubble defects which are eliminated by the invention are very undesirable and can render polymeric materials unuseful for most purposes, for example thermoformed sign faces are unacceptable if they contain substantial bubble defects.

Suitable metal compounds are those within formula I, for example
lead octoate,
lead n-dodecyl mercaptide,
lead mercaptoethanol,
lead acetylacetonate,
antimony acetylacetonate,
cadmium n-dodecyl mercaptide
antimony octoate,
chromium octoate,
nickel naphthenate,
aluminum acetylacetonate,
tin n-dodecyl mercaptide
zinc n-dodecyl mercaptide,
copper n-dodecyl mercaptide.

In the formula, R and R' can be octoate, naphthenate, hexanoate, acetylacetonate, stearate, oleate, palmate, caproate, cyclohexane butryrate, or other radicals defined by the formula where X is

as well as n-dodecyl mercaptide, mercaptoethanol, n-butyl mercaptide, n-octyl mercaptide, t-dodecyl mercaptide, stearyl mercaptide, and other radicals defined by the formula where X is —S—.

The amounts of metal compound suitable in the invention are about 0.0002 to 0.004 moles, based on metal (M), per 1000 grams of polymer or per 1000 grams of monomer system. These amounts are very small, especially as compared to the amounts of metal compounds which have been incorporated into prior art polymer systems. In the prior systems, the only use of metal compounds have been for completely different purposes. The above-defined amounts are equal to different weight percentage ranges, depending on the molecular weight of the particular metal; for example, they equal about 0.004 to 0.083 percent by weight lead, and about 0.0012 to 0.024 percent by weight nickel. On a lead octoate basis, the amounts convert to about 0.017 to 0.35 percent by weight, and on a nickel naphthenate basis equal about 0.02 to 0.39 percent by weight. Assuming an all methyl methacrylate system, the amounts convert to about 0.002 to 0.04 percent by equivalent.

The polymerization conditions include use of the well known polymerization catalysts, quantities and techniques. Exemplary catalysts are benzoyl peroxide, t-butyl hydroperoxide, di-t-butyl peroxide, cumene hydroperoxide, lauroyl peroxide, azobisisobutylronitrile, and the like. Amounts in the general range of about 0.01 and 1 percent by weight based on polymerizable monomers and preferably 0.03 to 0.05 percent by weight are used. Of course, conventional dyes, pigments, fire retardant additives, etc., can be added prior to polymerization. Also, conventional chain transfer agents such as n-dodecyl mercaptan, n-octyl mercaptan, and the like, are optionally included. One convention method of preparing the species of the metal salts wherein X is —S— is to react the excess mercaptan chain transfer agent in situ with a soluble metal salt of the formula wherein X is

by adding the latter salt at a point in the polymerization process where it is desirable to remove or reduce the quantity of free chain transfer agent present.

In order that the concept of the present invention may be more thoroughly understood, the following examples are set forth for the purpose of illustration of but a few specific embodiments. The invention is not in any way intended to be limited by the details set forth in these specific embodiments or by the detailed exemplification given previously. Parts are by weight unless otherwise indicated.

EXAMPLE 1

This example illustrates the effect of added lead naphthenate and n-dodecyl mercaptan on bubble formation in polymers subjected to thermoforming temperatures.

A syrup for continuous casting was prepared by mixing the following ingredients at 25°C. until a uniform solution was obtained:

61.00 parts of methyl methacrylate monomer (MMA)
39.00 parts of poly(methyl methacrylate) $\overline{M}_w$ = 95.000 g/eq
0.20 parts of 1,3 butanediol dimethacrylate
0.05 parts of a N-(2-cresyl) benzotriazole UV stabilizer
0.03 parts of $C_{12}$–$C_{16}$ alkyl phosphate mold release agent
0.05 parts of n-dodecyl mercaptan Then the following ingredients were added:
0.26 parts of lead naphthenate (30 percent by weight Pb)
0.05 parts of a 25 percent solution of acetyl peroxide in dimethyl phthalate
0.03 parts of azobisisobutyronitrile
0.18 parts of dicyclohexyl peroxydicarbonate Upon addition of lead naphthenate a yellow precipitate appears indicating the formation of insoluble lead n-dodecyl mercaptide.

Dissolved air was removed from the casting mix by degassing under vacuum. The casting mix was poured into a mold consisting of two metal plates separated by a compressible gasket designed to give a finished sheet 0.080 inch thick, heated under a pressure of about 45 psi at temperatures gradually increasing from 50°C. to 130°C. for 20 minutes, cooled to 80°C. and removed from the mold. The resulting sheet was clear and free of bubbles.

A portion of the sheet was heated in a forced air oven at 180°C. for one hour. No bubbles or blisters formed. The intrinsic viscosity in 102% $H_2SO_4$ was 1.96 g/dl and the residual MMA was 1.7 percent. A sheet cast from the same receipe except with the lead naphthenate omitted developed many large bubbles when heated for ½ hour at 180°C. The intrinsic visosity in 102% $H_2SO_4$ was 0.97 g/dl and the residual MMA level was 1.2 percent.

EXAMPLE 2

Example 1 was repeated, only substituting 0.18 parts dibutyltin bis(2-ethylhexanoate) for the lead naphthenate, reducing bubble formation relative to the same control.

EXAMPLE 3

Example 1 was repeated, only substituting 0.24 parts zinc naphthenate for the lead naphthenate, reducing bubble formation relative to the same control.

EXAMPLE 4

Example 1 was repeated, only substituting 0.29 parts cobalt naphthenate for the lead naphthenate, reducing bubble formation relative to the same control.

EXAMPLE 5

This example illustrates the effect of various metal salts on bubble formation in polymethyl methacrylate sheet at thermoforming temperatures.

Sheets cast from a solution of polymethyl methacrylate in methyl methacrylate under the same conditions with varying percentages of various metal salts had the following bubble formation behavior:

| ADDITIVE | AMOUNT (% Metal by wt.) | CONDITION | NUMBER bubbles/in.$^2$ |
| --- | --- | --- | --- |
| none | — | 180°C.-1hr. | 11 |
| lead n-dodecyl mercaptide | 0.014 | " | 0 |
| lead t-dodecyl mercaptide | 0.024 | " | 0 |
| lead n-dodecyl mercaptide | 0.024 | " | 0 |
| lead mercaptoethanol | 0.024 | " | 0 |
| cadmium octoate | 0.014 | " | 0 |
| none | — | 200°C.-½hr. | 1.2 |
| nickel naphthenate | 0.0068 | " | 0 |
| aluminum acetylacetonate | 0.0021 | " | 0.5 |
| antimony octoate | 0.0112 | " | 0 |
| chromium octoate | 0.0049 | " | 20 |
| chromium n-dodecyl mercaptide | 0.0049 | " | 50 |

EXAMPLE 6

This example shows the activity of aluminum acetylacetonate in compositions and processes of the invention.

A casting syrup was prepared by mixing the following ingredients at 25°C until a uniform solution was obtained. The axobisisobutyronitrile, acetyl peroxide and t-butyl peroxypivalate were added after the other ingredients were dissolved.

66.000 parts of methyl methacrylate monomer
34.000 parts of poly (methyl methacrylate/ethyl acrylate = 98.8/1.2 wt. %) $\overline{M}w$ = 105,000 g/eq
0.100 parts of trimethylolpropane trimethacrylate
0.015 parts of a $C_{12}$–$C_{16}$ alkyl phosphate
0.030 parts of a 25 percent solution of acetyl peroxide in dimethyl phthalate
0.030 parts of azobisiobutyronitrile
0.175 parts of a 75 percent solution of t-butyl peroxypivalate in mineral spirits
0.025 parts of aluminum acetylacetonate (0.00077 molar Al)

A sheet was prepared from this casting syrup as in example one. It had a residual MMA content of 1.0 percent and developed about 1 bubble/in$^2$ when heated for 1 hour at 200°C. A control sheet with the aluminum acetylacetonate deleted bubbled severly (greater than 50 bubbles/in$^2$).

EXAMPLE 7

This example shows the effect of antimony compounds in the invention.

A sheet was prepared as in example 6 except that the aluminum acetylacetonate was replaced by 0.043 parts of antimony octoate (0.00078 Molar Sb). It had a residual MMA content of 1.0 percent and also developed one bubble/in$^2$ when heated for one hour at 200°C.

EXAMPLE 8

This example shows the effect of cadmium compounds in the invention.

A casting syrup was prepared by mixing the following ingredients at 25°C until a uniform solution was obtained. The azobisisobutyronitrile, acetyl peroxide, t-butyl peroxypivalate and cadmium octoate were added after the other ingredients were dissolved.

61.000 parts of methyl methacrylate monomer (MMA)
39.000 parts of poly (methyl methacrylate $\overline{M}w$ = 95,000 g/eq
0.100 parts of trimethylolpropane trimethacrylate
0.015 parts of a $C_{12}$–C alkyl phosphate mold release agent
0.175 parts of a 75 percent solution of t-butyl peroxypivalate in mineral spirits
0.030 parts of a 25 percent solution of acetyl peroxide in dimethyl phthalate
0.030 parts of azobisisobutyronitrile
0.100 parts of cadmium octoate (0.0025 Molar Cd)
0.050 parts of n-dodecylmercaptan
0.050 parts of N-(2-cresyl) benzotriazol, a UV stabilizer A sheet was prepared from this casting syrup as in example one. It had a residual MMA content of 0.8 percent and developed no bubbles when heated for one hour at 180°C. A control sheet with the cadmium octoate deleted had a residual MMA content of 0.9 percent and developed 11 bubbles/in$^2$.

EXAMPLE 9

This experiment demonstrates reduction in bubble formation combined with increase in thermoformability and solvent cementability by the process and composition of the invention.

A sheet was prepared as in Example 8 except that the cadmium octoate was replaced by 0.10 parts of lead naphthenate (24 percent lead) and the trimethylolpropane trimethacrylate was replaced by 0.10 parts of 1,3 butanediol dimethacrylate, 1.4% titanium dioxide was added for pigmentation and it was cast to a final thickness of 0.187 inch. It had a residual MMA content of 1.5 percent and developed no bubbles after ½ hour at 180°C. A sheet cast from the same formulation but with the lead naphthenate deleted bubbled severely (>50 bubbles/in$^2$) when heated at 180°C for ½ hour. Another sheet cast from the same formulation but with the lead naphthenate deleted and the 1,3 butanediol dimethacrylate increased to 0.65 parts also developed no bubbles after ½ hour at 180°C.

The modulus of elasticity of this sheet was calculated at three temperatures by measuring its elongation 30 seconds after the application of a weight to a vertically hung strip.

The moduli of elasticity at 120°, 140° and 160°C. were 325, 201, and 121 psi respectively. The moduli of elasticity for the sheet containing lead naphthenate tested under the same conditions were 310, 178, and 93 psi, indicating greater formability. The solvent cementability of these two samples was tested by wetting the ends of two strips of each sheet with methylene dichloride, joining these ends to form a butt joint, drying for 24 hours and measuring the tension required to break it. The highly crosslinked sample yielded at 362 psi while the sheet containing lead naphthenate required 1,211 psi to break, indicating improved solvent cementability.

I claim:

1. A composition comprising (A) a polymer of a monomer system comprising about 70 to 100 weight percent methyl methacrylate monomer with the balance selected from the group consisting of lower alkyl acrylates, other lower alkyl methacrylates wherein the alkyl group has between two and four carbon atoms, the polymerizable styrenes, cycloalkyl esters of acrylic and methacrylic acid, and acrylic acids and amides and (B) about 0.0002 to 0.004 moles, based on metal, per 1000 grams of (A), of a compound of the formula

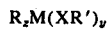

wherein $z=0$ to 3; $y=1$ to 4; $z + y=$valence of M; X represents

or —S—; M, when X is —S—, is a metal selected from the group consisting of $Pb^{II}$, $Pb^{IV}$, $Sn^{II}$, $Sn^{IV}$, $Zn^{II}$, $Cd^{II}$, and $Cu^{II}$; M; when X is

is a metal selected from the group consisting of $Pb^{II}$, $Pb^{IV}$, $Sn^{II}$, $Sn^{IV}$, $Sb^{III}$, $Zn^{II}$, $Cd^{II}$, $Al^{III}$, and $Ni^{III}$; and R and R' are the same or different acyclic or cyclic alkyl, alkenyl or alkynyl radicals containing 1 to 20 carbon atoms, optionally containing one or more substituents selected from the group consisting of halo-, alkoxy-, carboxy-, and hydroxy-; said compound being further defined as effective to prevent bubble formation at thermoforming temperatures.

2. The composition of claim 1 wherein M is $Pb^{II}$.
3. The composition of claim 1 wherein z is 0.
4. The composition of claim 1 wherein X is —S— and R is $n$-$C_{12}H_{25}$.
5. The composition of claim 2 wherein R is $n$-$C_7H_{15}$.
6. The composition of claim 1 wherein the monomer system contains at least 90 weight percent methyl methacrylate and less than 0.2 weight percent polyunsaturated copolymerizable crosslinking monomer.
7. A process for improving the thermoformability of polymers comprising polymerizing a monomer system containing about 70 to 100 weight percent methyl methacrylate with the balance selected from the group consisting of lower alkyl acrylates, other lower alkyl methacrylates wherein the alkyl group has between two and four carbon atoms, the polymerizable styrenes, cycloalkyl esters of acrylic and methacrylic acid, and acrylic acids and amides comprising introducing about 0.0002 to 0.004 moles, based on metal, per 1000 grams of monomer system, of a compound of the formula defined in claim 1 in the monomer system.
8. The process of claim 7 wherein said polymerization temperature is about 60° to 90°C.
9. The product of claim 1 prepared under free radical polymerization conditions.

* * * * *